C. STILL.
RECOVERY OF TAR AND AMMONIA FROM COAL GAS.
APPLICATION FILED DEC. 3, 1912.
1,080,938.
Patented Dec. 9, 1913.
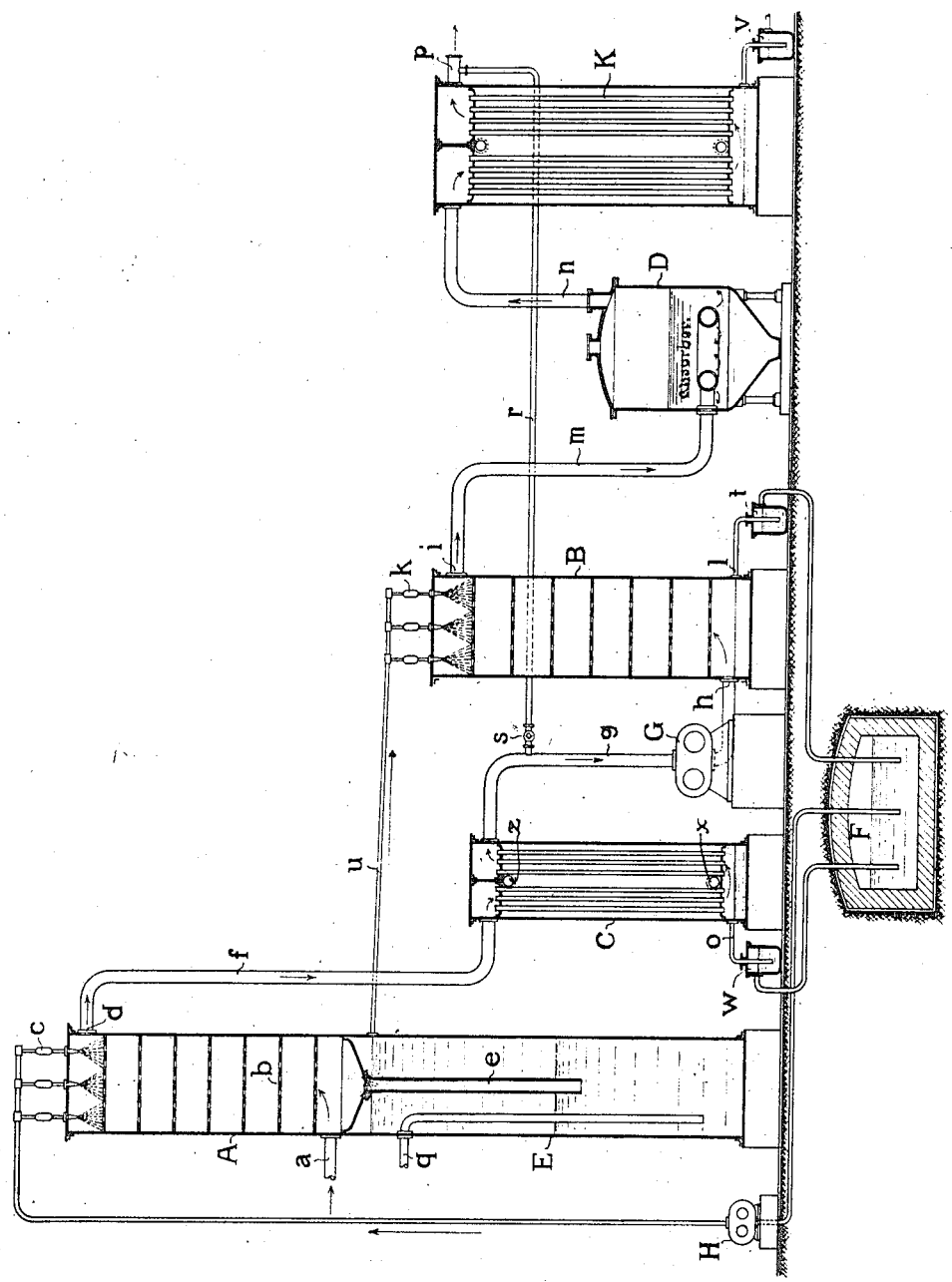
Witnesses:
Arthur Kuhn.
Gustav Lambert.
Inventor:
Carl Still.

UNITED STATES PATENT OFFICE.

CARL STILL, OF RECKLINGHAUSEN, GERMANY.

RECOVERY OF TAR AND AMMONIA FROM COAL-GAS.

1,080,938. Specification of Letters Patent. Patented Dec. 9, 1913.

Application filed December 3, 1912. Serial No. 734,708.

*To all whom it may concern:*

Be it known that I, CARL STILL, a subject of the German Emperor, residing at Bismarckplatz, Recklinghausen, Germany, have invented certain new and useful Improvements in the Recovery of Tar and Ammonia from Coal-Gas, of which the following is a specification.

My invention relates to a method of separating tar and ammonia from gases obtained by the dry distillation or gasification of the coal, and aims at the recovery of these two by-products in a manner very profitable and avoiding all faults of the methods heretofore known.

The method, hereinafter described, is based upon the idea to cool down first the hot crude gases to about atmospheric temperature whereby the tar is completely removed, and then to heat afterward the gases freed from tar to such a temperature that they absorb again in form of steam the water condensed through the previous cooling, so that finally the gases contain the whole quantity of water, and hence also the whole quantity of ammonia originally contained in the crude gases but no traces of tar, and can be subjected in this state to the process of ammonia absorption by means of acid.

The cooling as well as the subsequent reheating of the gases is made directly by means of water injected or otherwise brought into intimate contact with the gases by any suitable means in such a way that a certain quantity of water is used alternately first for the cooling during which process it absorbs heat and is increased at the same time by the volume of the water condensed out of the cooled gases, and that afterward the water heated in the first stage is used for the direct reheating of the cooled gases whereby, on the one hand, the water is again cooled, on the other hand, the quantity of the water condensed during the cooling of the gases is rendered again to the gases in form of steam. It results therefrom that a continuous circulation of the said quantity of water takes place, the gases as well as the water being continuously cooled and reheated.

The drawing annexed shows, partly in a vertical section, partly as a direct view an arrangement which can be used for the working of the process.

The method of working is as follows:—
The letter A designates the apparatus used for directly cooling the hot gases, B the apparatus serving the direct heating of the gases, and C an intermediate cooler acting indirectly. The tanks E and F serve the storage of the liquids flowing from the apparatus A and B. The saturater marked D is used for the absorption of the ammonia from the gases, and K is a cooler for finally cooling the completely treated gases. The gas to be treated enters in a hot state the cooler A—arranged for direct cooling—at $a$ by the action of the exhauster G, and rises upward, encountering a stream of water serving as a cooling medium. The water is taken out of the tank F by means of the pump H, injected into the cooler A at its top part by means of the distribution nozzles $c$ and brought into intimate contact with the gases by a series of perforated sheets $b$. During this process, the temperature of the injected water comes finally, at the point where it runs off below, nearly up to that of the gas entering at this place, while, on the other hand, the gas leaves the top part of the cooler A at $d$ with a temperature slightly above that of the injected water. The strong cooling of the gases causes all condensable constituents of it— that is to say, the tar including the naphthalene and besides the water first carried along with the crude gases as steam—to separate out. Besides, by this process, especially the elimination of tar particles is considerably furthered owing to the washing effect of the directly injected water. The products of condensation flow along with the injected and strongly heated water through the pipe $e$ into the tank E. Here, the heavier tar separates from the lighter water, the tar settling down at the bottom, the water floating on top of the tar. The water flows hence, by an inclined pipe $u$, to the distribution nozzles $k$ on top of the heater B which serves the direct reheating of the gas while the tar can be taken out from the tank E by the pipe $q$. The gas leaving the cooler A at $d$ and further driven by the action of the exhauster G through the pipe $f$, is brought first to the intermediate cooler C, the importance of which will be described later on, and hence through the pipes $g$ and $h$ to the heater B serving the direct reheating of the gas. In this heater B, the water running off from the cooler A through pipe $u$ is brought into intimate contact with the gas entering at the bottom at $h$, in exactly the same manner as in the cooler A. The temperature of the gas previously cooled is raised nearly up to that of the injected hot water and, at the same time, the gas is—according to its higher temperature—again saturated with the vapors of the water condensed during the previous cooling. The hot gas leaves the heater B at $i$ and is then conducted through the pipe $m$ to the saturater D for the direct absorption of the ammonia. The water used in the heater B for heating the gases flows below at $l$ into a pot $t$ and hence into the tank F. From thence it is again brought, by the pump H, to the distribution nozzles $c$ on top of the cooler A in order to be used again for the cooling of the hot crude gases and for the further treatment in the manner hereinbefore described.

The intermediate cooler C between the cooler A and the heater B is the most important part of the whole installation, as only this cooler enables the maintenance and regulation of the working of the whole plant. There are two objects mainly which will be attained by the arrangement of the said cooler C:—Firstly, by means of it, the final temperature of the gas to be cooled will be brought, on account of the additional cooling effected, to a certain degree required which can be exactly controlled; secondly, in consequence of its insertion between the two separated stages of the process, i. e. the stage of the direct cooling of the gas in the cooler A on the one hand and the stage of the reheating of the same in the heater B on the other hand, a certain decrease in temperature is imparted to the gas while flowing from the former to the later stage whereby the result is attained that the heat to be transferred passes on always at first, in the cooler A, in the direction from the gas to the circulating water and subsequently, in the heater B, in the reversed way from the water to the gas.

The arrangement of the additional cooling effected by the intermediate cooler C after the main-cooling which takes place in the direct cooler A is of considerable value in view of the fact that the final temperature of the cooled gas obtained in the direct cooler A will be independently regulated by itself, as soon as a permanent state has been reached, to an equilibrium the degree of which will vary as the conditions of working in the plant are altered, especially as the temperature of the crude gas entering the process will be higher or lower. By the arrangement of the special intermediate cooler C which is worked separately for itself, means are given to secure always, by the aid of a suitable additional cooling, a final temperature of the cooled gas which for the whole process and especially for an effective separation of the tar, is the most favorable.

The requirement of inserting a special decrease in temperature of the gas between the two stages of the direct cooling in the cooler A and the direct reheating in the heater B is based upon the fact that the gas in these two stages is treated with one and the same body of water circulating in the plant which has to serve in turn, over and over again, for the cooling and reheating of the gas.

It is a peculiarity of the method hereinbefore described that the water used in continuous circulation has, upon leaving the heater B wherein it has served the heating of the gas, the same temperature as it has upon entering immediately afterward the cooler A (at the top part at $c$), wherein it serves now the cooling of the gases. Now, by arranging the intermediate cooler C and thereby causing a decrease in temperature of the gas conducted through the same, it results that the temperature of the gas upon leaving the cooler A is somewhat above, and upon entering the heater B is somewhat below the temperature of the water, at these two points respectively, so that the transition of heat takes place in both cases as desired.

The cooler C itself can be made as a cooler of the tubular type and worked by means of cooling water in an indirect way; this water which is taken from any separate source can be supplied, for instance, through the inlet $x$ below into the space surrounding the tubes and discharged through the upper outlet $z$. The small quantities of water condensed from the gas during this cooling can be recovered separately and let off at $o$ into the pot $w$. From thence the condensed water flows to the storage tank F into the cooling water stored therein. The gas, after having left the saturater D in which all ammonia is recovered as a solid salt, is then conducted through the pipe $n$ to the final cooler K, in order to be cooled down to such a temperature as is suitable for and required by its further use. The cooler K is here also shown as an indirectly acting cooler of the tubular type, which is worked by means of cooling water in a similar way as the intermediate cooler C described above, so that the condensing water which is eliminated within it from the gas can be recovered again separately, and will be let out into the pot $v$. This condensing water separated out is a very pure water and contains no admixture whatsoever. Therefore, the final cooler K can also be formed as a directly working cooler, bringing the gas in direct contact with the cooling water, in exactly the same way as in the case of the cooler A, so that the condensed water would be added to the injected cooling water. The cooled gas leaves the cooler K through the connection p and thence it is conducted to the places of its further use.

An improved and far easier manner of performing the whole process can be attained by reconducting a part of the completely treated gas, which has left the cooler K, together with the main flow of gas through the heater B. This is carried out in the following way:—A pipe r is branched off from the connection p of the cooler K and connected to the suction pipe g of the exhauster G, a damper or valve s being provided. By this means, the volume of the cooled gas to be carried through the heater B can be increased by any required volume of gas which has likewise been cooled. The result is that the gas passing through the heater B increases, according to the greater volume, its faculty of absorbing steam, and this guarantees that the water which was condensed during the first cooling of the gas in the cooler A is again completely absorbed by the gas in form of steam in the heater B during the subsequent reheating.

Another improvement and perfection of the process is attained by taking off continuously a quantity of the water collected in the tank E and conducting it into the hydraulic main on top of the coke ovens, or the retorts from which the gases to be treated are originally obtained. Inside of this main, by the heat of the highly heated crude gas, the water brought in is turned into steam and carried in this state, along with the gas, into the cooler A at a. The result is that the quantity of heat contained in the gas which enters at a is considerably increased by the addition of the heat of the steam without necessitating a higher temperature of the gas. It appears that in this way an advantageous use is made of the heat contained in the highly heated crude gas in the hydraulic main on top of the ovens, which, otherwise, would be lost on account of the cooling effect of the surrounding atmosphere. By increasing the heat of the gas to be treated, there is the advantage that thereby a greater amount of heat is introduced into the process from the beginning. The greater quantity of heat is, of course, later on to be found in the water serving the direct cooling and reheating respectively and facilitates correspondingly the reheating of the gases in the heater B.

The stream of water continuously circulating between the cooler A and the heater B absorbs, as a matter of fact, a certain quantity of free ammonia ($NH_3$) on some places, but then, on other places of the circulation, the like quantity of ammonia must be rendered to the gas by the action of the heat, because only a certain quantity of water is used over and over again, which, as a whole, can absorb only a certain and limited quantity of free ammonia. It is thereby insured, that, after obtaining a permanent state in the whole system, the whole of the free ammonia originally contained in the crude gas is immediately carried to the saturater D wherein it is recovered directly as a solid ammonia salt. In the case however that the crude gas contains ammonia also in fixed form, the ammonia will go over to the water serving for direct cooling and reheating respectively, but it does not return to the gas, because the mere influence of heat is not sufficient to free the fixed ammonia. The water used in circulation must, therefore, gradually be enriched with ammonia salts. In this case it is advisable to let the water be enriched to a certain concentration with fixed ammonia and then to draw off regularly certain quantities, the deficiency being made up, if necessary, with the addition of fresh water. The ammoniacal salt lye removed can either be added directly to the saturater D, presumed that this does not prove to be too strong a dilution of the saturation bath, or, any agreeable method may be employed to free the ammonia from the liquor and to render it accessible for saturation. The most simple way to work up the ammoniacal salt lye is to distil it in the usual way by adding lime and to conduct the ammonia vapors, which arise from this treatment, together with the gas leaving the heater B, into the saturater D.

The advantages of the process consist in the success obtained as regards the separation of tar and the extraction of ammonia. As regards to the separation of tar, the first advantage is to separate the tar by an intensive cooling of the gas. In comparison with the process of washing out the tar from the hot crude gases, a complete removal of the tar constituents and especially of the naphthalene is obtained by the means described. Besides, in the new process the separation of the tar particles from the gases is equally assisted by the washing effect of the cooling water brought in direct contact with the crude gases.

An important advantage for the extraction of ammonia is that the gases being completely free of tar can be saturated with the whole quantity of free ammonia contained in the crude gases. This success is arrived at without specially treating any large quantities of condensed water for the abstraction of ammonia. Contrasted with the usual process, i. e., firstly to cool the gas in tubular coolers and then to saturate the cooled gas with acid for extracting ammonia, which process involves very extensive arrangements for treating the great quantities of water condensed in the cooling of the gas, this is avoided here from the commencement because practically no water is extracted from the gas. Likewise, losses of fixed ammonia are absolutely impossible because all the fixed ammonia goes over to the water used for direct cooling and reheating respectively, and can be obtained again without loss from it.

The process enables the complete and separate recovery of the by-products, tar and ammonia from the coal gas in a way, which, on the one hand, is quite simple and convenient, on the other hand, free from all difficulties and troubles. Thereby, the recovery of these by-products in the most convenient manner is attained and assured.

What I claim is:—

1. The process for recovering tar and ammonia from coal gas, which consists in cooling the hot crude gas by water brought directly in contact therewith for separating out the tar and, after a special intermediate cooling of the gas, reheating the latter by water used previously for direct cooling of the gas, the water itself being used in circulation alternately for cooling and reheating the gas, then conducting the reheated gas through a saturation bath for absorbing the ammonia, and finally cooling the gas free from tar and ammonia to the temperature necessary for further use, substantially as specified.

2. The process for recovering tar and ammonia from coal gas, which consists in cooling the hot crude gas by water brought directly in contact therewith for separating out the tar and, after a special intermediate cooling of the gas, reheating the latter by water used previously for direct cooling of the gas, the water itself being used in circulation alternately for cooling and reheating the gas, then conducting the reheated gas through a saturation bath for absorbing the ammonia, finally cooling the gas free from tar and ammonia to the temperature necessary for further use, and reconducting continuously a certain volume of the finally cooled gas to the main flow of gas to be led into the direct heater and afterward into the saturation bath, substantially as specified.

3. The process for recovering tar and ammonia from coal gas, which consists in cooling the hot crude gas by water brought directly in contact therewith for separating out the tar and, after a special intermediate cooling of the gas, reheating the latter by water used previously for direct cooling of the gas, the water itself being used in circulation alternately for cooling and reheating the gas and a part of the water being continuously taken off and conducted into the hydraulic main of the ovens from which the gas is originally obtained, then conducting the reheated gas through a saturation bath for absorbing the ammonia, and finally cooling the gas free from tar and ammonia to the temperature necessary for further use, substantially as specified.

In testimony whereof I have affixed my signature in presence of two witnesses.

CARL STILL.

Witnesses:
ARTHUR KUHN,
GUSTAV LAMBERTZ.